United States Patent [19]

Denis et al.

[11] Patent Number: 4,836,971
[45] Date of Patent: Jun. 6, 1989

[54] METHOD FOR MANUFACTURING HEAT RESISTANT PET CONTAINERS

[75] Inventors: Gerard Denis, Turretot; Jean-Michel Rius, Le Havre, both of France

[73] Assignee: Sidel, Le Havre, France

[21] Appl. No.: 925,587

[22] Filed: Oct. 31, 1986

[30] Foreign Application Priority Data

Mar. 4, 1986 [FR] France ................. 86 03013

[51] Int. Cl.⁴ ............ B29C 49/06; B29C 49/18; B29C 49/64
[52] U.S. Cl. .................. 264/521; 264/530; 264/532; 264/342 R
[58] Field of Search ........... 264/521, 528, 529, 530, 264/531, 532, 535, 235, 346, 342 R

[56] References Cited

U.S. PATENT DOCUMENTS

| 4,177,239 | 12/1979 | Gittner et al. | 264/530 |
| 4,375,442 | 3/1983 | Ota et al. | 264/521 |
| 4,385,089 | 5/1983 | Bonnebat et al. | 264/528 |
| 4,512,948 | 4/1985 | Jabarin | 264/529 |

FOREIGN PATENT DOCUMENTS 0155763  9/1985  European Pat. Off. ............ 264/530

Primary Examiner—Jan H. Silbaugh
Assistant Examiner—Neil Michael McCarthy
Attorney, Agent, or Firm—Sughrue, Mion, Zinn, Macpeak and Seas

[57] ABSTRACT

A heat resistant container is made from a PET preform by crystallizing its neck (10), heating just its body to the softening temperature of PET, blow molding an intermediate container (21) in a cooled mold (5° to 40° C.) with a larger volume than that of the final container to be obtained, heating the intermediate container to 180°–220° C. for 1 to 15 min, and then molding it a second time to its final dimensions at a temperature of 80°–100° C. for 2 to 6 sec.

6 Claims, 5 Drawing Sheets

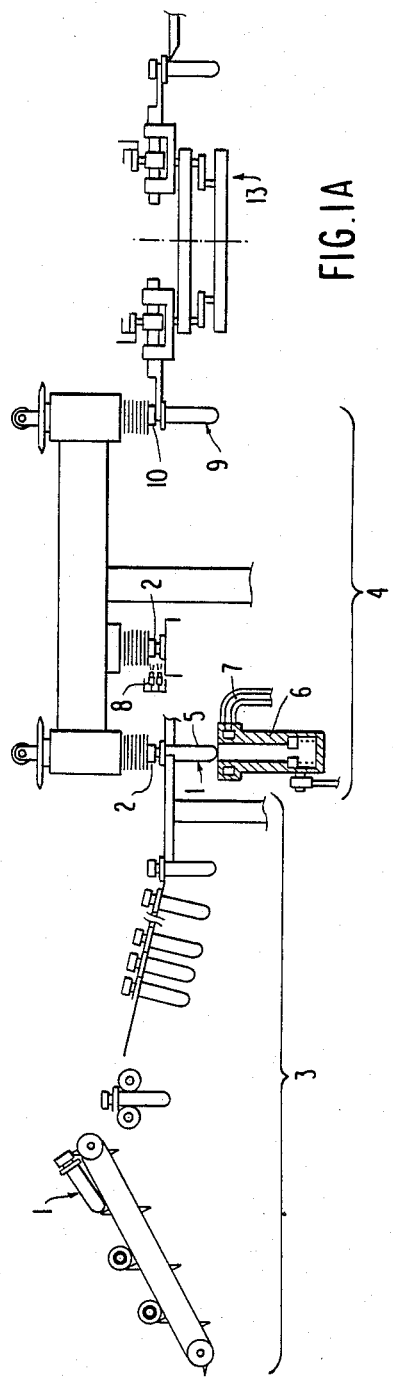
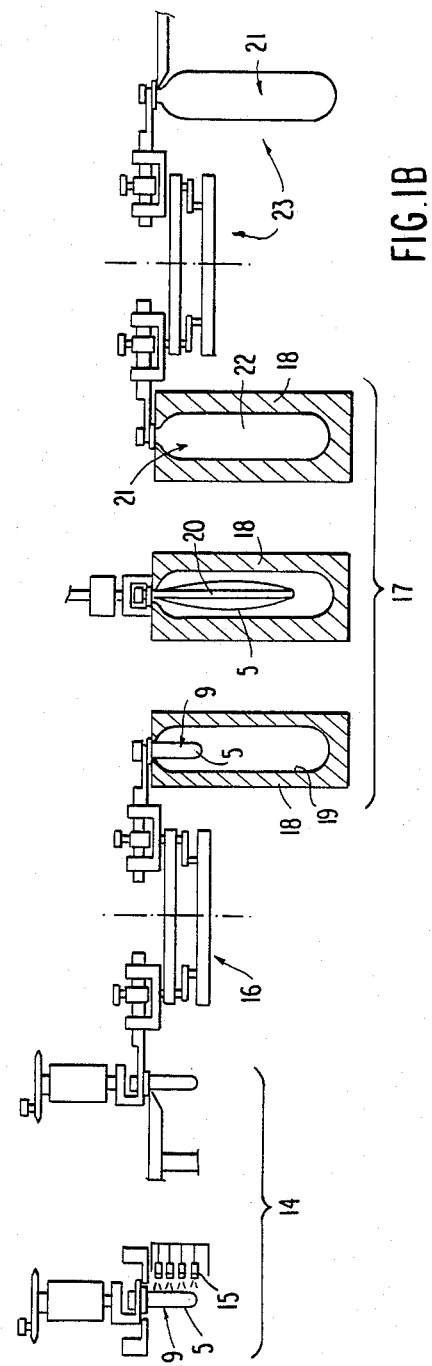
FIG.1A
FIG.1B

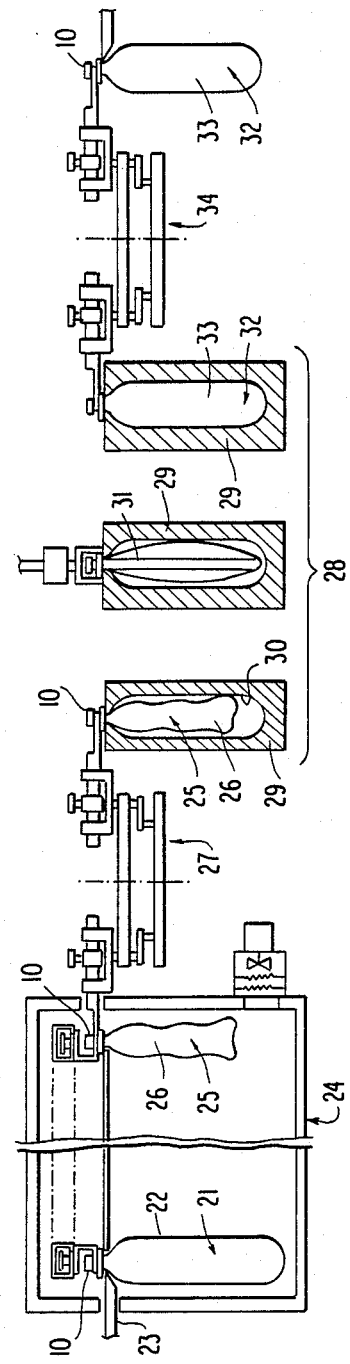

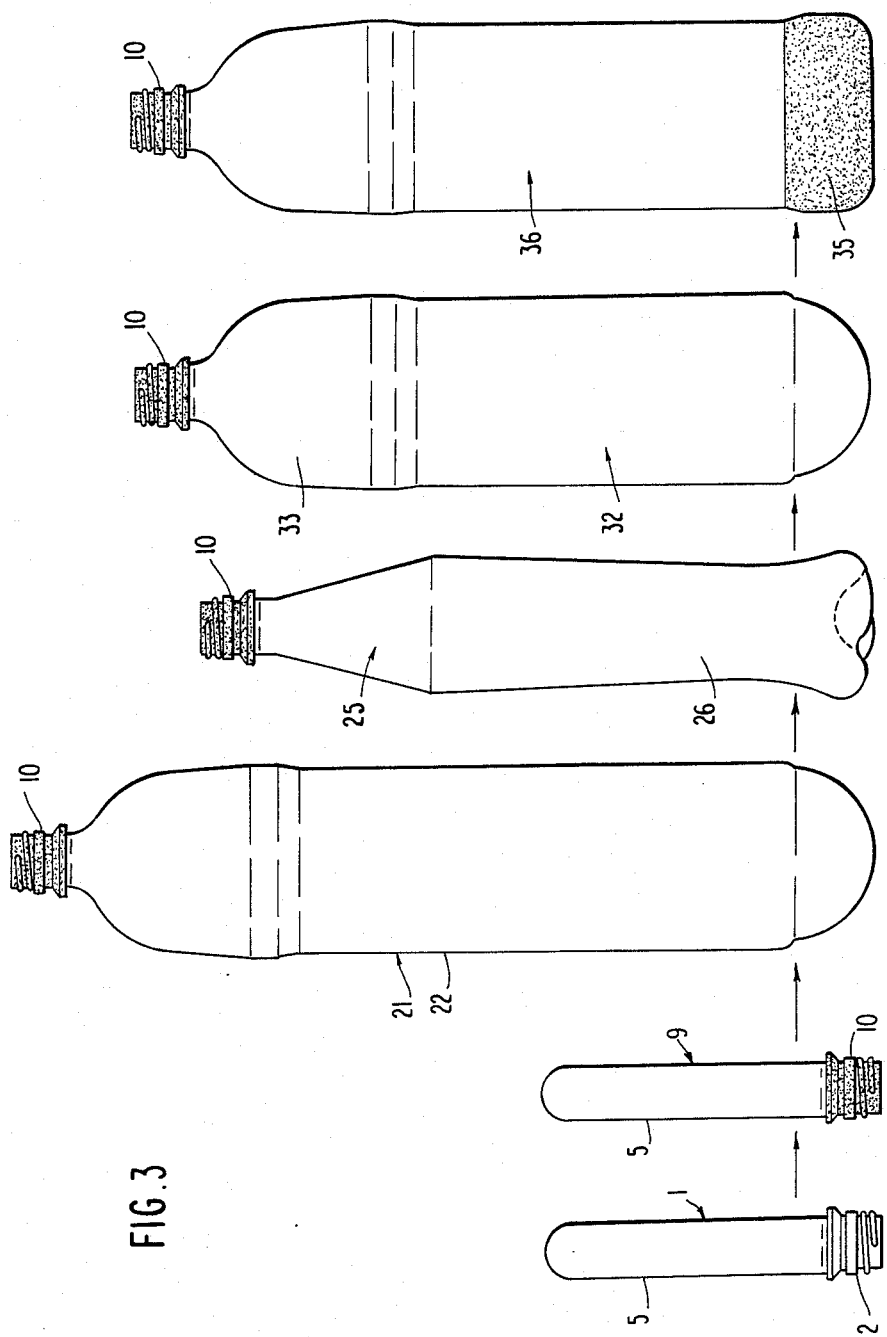

METHOD FOR MANUFACTURING HEAT RESISTANT PET CONTAINERS

BACKGROUND OF THE INVENTION

The present invention relates to a method and an apparatus for manufacturing polyethyleneterephthalate (PET) containers, such as bottles, which, during use, are capable of withstanding relatively severe heat conditions without undue deformation.

PET containers are widely used for the commercially for certain liquids containing gases such as $CO_2$, for example carbonated lemonades, sodas, fruit juices, etc. However, due to their manufacturing process, these containers cannot be subjected, without undue deformation, to relatively severe heat conditions such as the high temperatures of up to 95° C. encountered during the filling of the containers with a hot liquid or such as the fairly high temperatures (60° to 80° C.), which are maintained for a long period of time (1 to 2 hours), encountered during the pasteurization of the liquid contents of the containers. All these conditions are encountered during the packaging of certain flat liquids, such as non-carbonated fruit juices, or of certain carbonated liquids, such as beer.

Attempts have been made to overcome these disadvantages and to adapt PET containers for the stocking of products such as carbonated or non-carbonated fruit juices or beer. For this purpose PET bottles have ben produced which can withstand being filled with a hot liquid, about 85° C., with relatively little deformation which is acceptable. Such filling gives the container a relatively brief thermal shock, on the order of a few minutes, and the relatively small deformation is limited solely by the brevity of the heat phenomenon.

Experience has shown, however, that these known containers cannot withstand the process of pasteurization of their liquid contents, which is generally conducted at a temperature below 85° C.; this temperature varies as a function of the $CO_2$ content, for example from 78° C. for a liquid containing 3.5 g/liter of $CO_2$ to 65° C. for a liquid containing 6 g/liter of $CO_2$. The treatment lasts about one hour, and the containers are unacceptably deformed by a variation in volume of 30% and more.

SUMMARY OF THE INVENTION

An object of the invention is thus to overcome these disadvantages by providing a method and apparatus for the manufacture of PET containers, such as bottles, which are able to withstand relatively severe heat conditions of 60° to 95° C. which are likely to be maintained for at least one hour.

The method comprises the following steps:

(a) on a container preform of amorphous PET, with the neck of the container having been provided in advance with its final shape and size, a heat treatment of the neck only is carried out at a temperature and for a length of time sufficient to crystallize the neck, which is then cooled slowly;

(b) only the body of the preform (exclusive of the neck) is heated to the softening temperature of the PET;

(c) the hot preform body is molded to form an intermediate container whose body is approximately 20% greater in height and from 0 to 30% greater in width than the size of the final container, while the mold walls are cooled to a temperature of approximately 5° to 40° C.;

(d) the body of the intermediate container is then heated to a temperature of 180° to 220° C. for a period of approximately 1 to 15 min;

(e) then finally the hot container is molded once more to its final shape and size, at a temperature of 80° to 100° C. for a period of approximately 2 to 6 seconds.

During step (b) the temperature may be approximately 100° to 120° C. for a period of 10 to 60 seconds, preferably for 25 seconds. The molding carried out in step (e) may preferably take place at a temperature of 90° to 95° C. for approximately 4 seconds. During step d) the neck is preferably maintained at a temperature not exceeding 80° C., and preferably at about 70° C. The molding operation of step (c) is preferably carried out for a period of 3 to 10 seconds, with the mold walls being cooled to a temperature of approximately 10° to 15° C. During the molding operations of steps (c) and (e), the body of the preform or the container, respectively, is lengthened mechanically so that axially it occupies the entire length of the mold matrix, and a fluid under pressure is blown in to expand it and cause it to take on the shape of the walls of the matrix.

A container so manufactured has the desired properties of good heat resistance in a relatively hot environment. In particular, it can withstand a hot filling process at temperatures up to 95° C. with substantially less deformation than the prior art containers. By way of example, during hot filling at a temperature of 93° to 95° C., bottles in accordance with the invention undergo a variation in volume of less than 5%, and typically on the order of 2%.

The good temperature resistance is especially applicable to the pasteurization of the liquid contents of the container, which may contain $CO_2$. The container must be able to withstand, without considerable deformation, relatively severe heat conditions on the order of 60° C. to 85° C. for relatively long periods of time on the order of 1 to 2 hours. As an example, the of pasteurization of a liquid containing $CO_2$ must be conducted for a period of one hour at the following temperatures:

approximately 78° C. if the liquid contains 3.5 g of $CO_2$/liter, approximately 75° C. if the liquid contains 4.5 g of $CO_2$/liter, approximately 70°-72° C. if the liquid contains 5.5 g of $CO_2$/liter, and approximately 65° C. if the liquid contains 6.0 g of $CO_2$/liter.

By way of comparison, the following two examples can be given:

A prior art bottle with a 1.5 liter capacity was produced from ICI B90S, a known material, using a known method. It was filled with a liquid containing 6 g of $CO_2$/liter, and subjected to a pasteurization process at 70° C. for 2 hours. During such time the bottle was considerably deformed (its volume increased approximately 35%) and it had to be rejected.

A bottle with the same characteristics and composed of the same material, was produced using the method of the invention, filled with the same liquid, and subjected to the same treatment. Its deformation was relatively small (its volume increased approximately 6.5%) and it remained acceptable.

According to analyses performed by applicants, the advantageous characteristics of a container produced using the method of the invention, as compared to a container produced in accordance with a conventional method, are essentially due, in all probability, to the two successive moldings carried out at low and medium temperatures, respectively, using heat treatments at high temperatures but which are distinct from the molding operations. This staggering of operations gives the material two distinct crystalline biorientations, which considerably reinforces the mechanical resistance of the container which is subsequently placed in severe heat conditions, whereas the use of conventional methods, with one or two molding processes carried out at very high temperatures, gives the material only a single crystalline biorientation which is insufficient to give it the desirable resistance to heat during use.

The apparatus of the invention comprises a first heating device arranged to heat only the neck, which is already conformed to its final shape and size, of a container preform composed of amorphous PET. The heating device generates a temperature which crystallizes the PET of the neck and, in addition, protects the body of the container to prevent it from being heated. After the slow cooling of the neck, a second heating device heats only the body alone of the preform (exclusive of the neck) to the softening temperature of the PET, whereafter a first mold matrix forms the body of an intermediate container from the body of the preform. Such matrix has a mold cavity approximately 20% greater in height and from 0 to 30% greater in width than the dimensions of the final container to be obtained, and is provided with means for cooling the walls of the cavity to a temperature of 5° to 40° C. A third heating device heats only the body of the intermediate container to a temperature of 180° to 220° C., and a second mold matrix then forms the final body of the container from the heated intermediate container. The second matrix is provided with means for heating its cavity walls to a temperature of 80° to 100° C.

Heat protection means and possibly cooling means are preferably arranged to thermally protect the neck or body of the container which is not to be heat treated at the first, second, and third heating devices. The first and second mold matrices preferably contain a mandrel which is movable axially inside the mold cavity to longitudinally lengthen the body of the container, as well as means for blowing a fluid under pressure inside the body of the container to expand it against the walls of the cavity.

The apparatus of the invention has the advantages of using already existing container preforms, without modifications and/or adaptations of them; of thus using the same raw material used in the past for the manufacture of carbonated liquid bottles; of continuing to use substantially the same weight of raw material per container; and of enabling very high rates of production, for example on the order of 5000 bottles per hour.

BRIEF DESCRIPTION OF THE DRAWINGS

FIGS. 1A to 1C schematically illustrate the successive operations of the method in accordance with the invention;

FIG. 3 shows the various stages of a bottle made in accordance with the invention during its manufacture, corresponding to the stations of the apparatus and to the steps of the method.

DETAILED DESCRIPTION OF THE PREFERRED EMBODIMENT

Figure 2A:
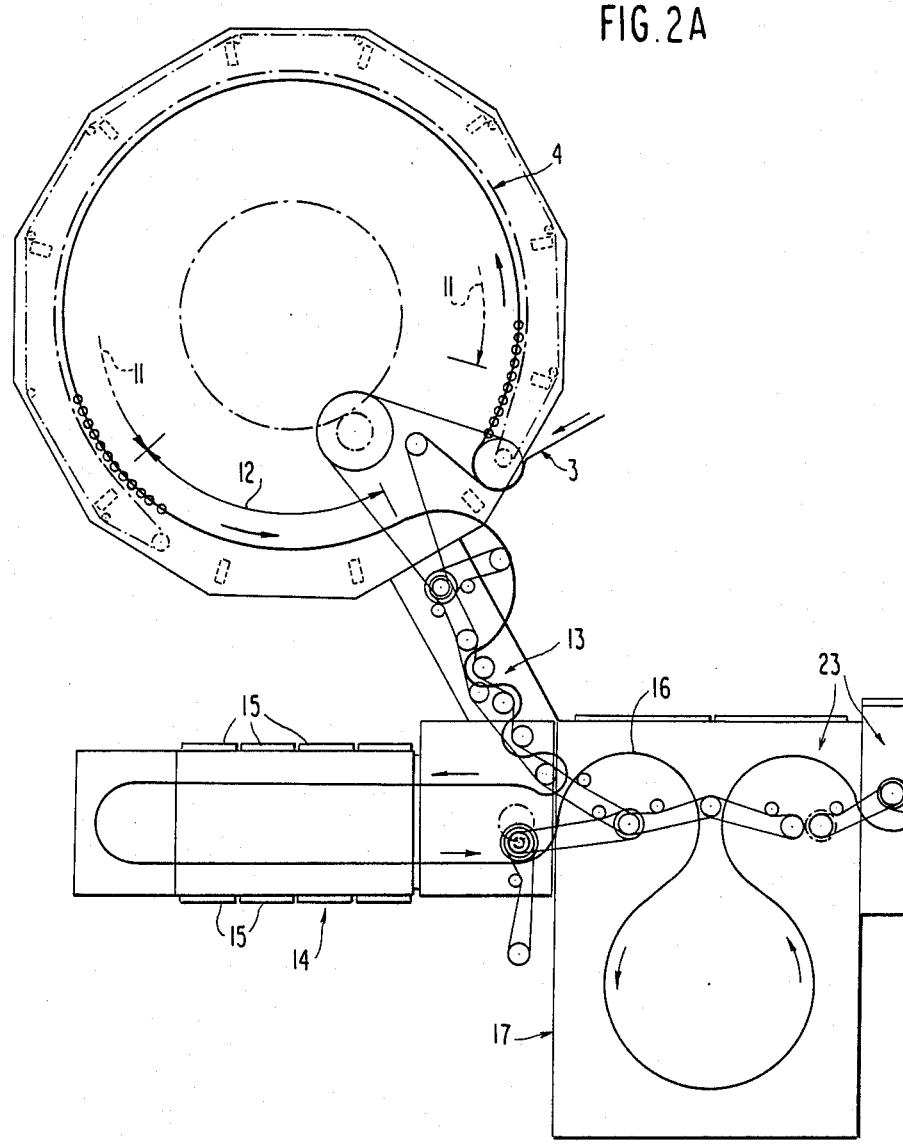
FIGS. 2A and 2B are schematic plan views of an apparatus in accordance with the invention, with its successive stations corresponding to the operations shown in FIGS. 1A to 1C.
Figure 2B:
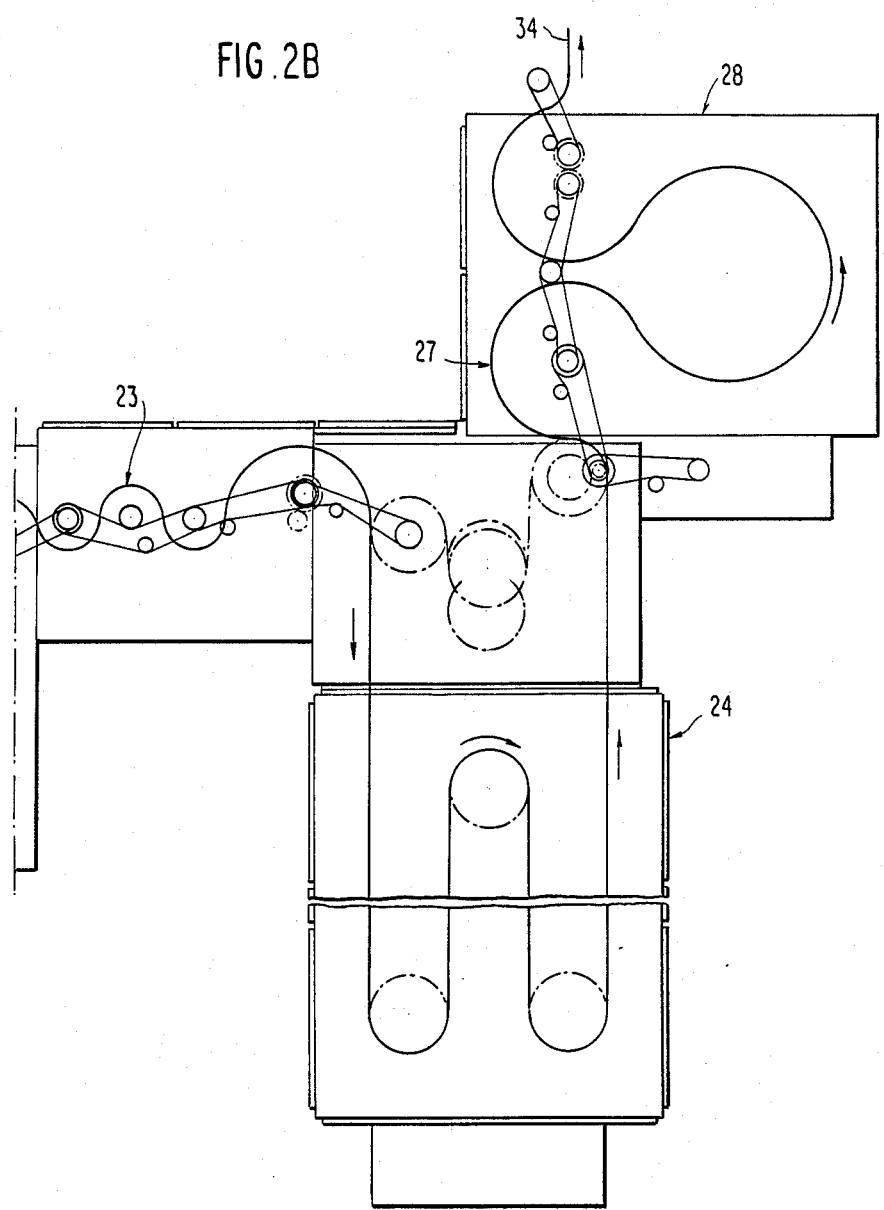

Referring now to the drawings, the working of the invention is carried out starting from a bottle preform 1 obtained, in a manner known per se, by the injection molding of polyethyleneterephthalate (PET), for example the product sold under the name ICI B90S; at this initial stage the PET is amorphous and the preform is transparent. It should also be noted that the preform is already molded with a neck 2 which has its exact final shape and dimensions.

The preforms 1 are oriented and conveyed by a transport device 3 to a first heating station 4 for the heat treatment of their necks 2. The body 5 of each preform is placed in a protective skirt 6 which is preferably traversed by a cooling fluid, as at 7 in FIG. 1A. The neck 2 of the preform, however, remains outside of the protective skirt 6 and a mandrel (not shown) penetrates inside it to physically hold it during the subsequent heat treatment. At this point the neck 2 is exposed to an infrared heating device 8 to bring it to a temperature of at least 190° C. (PET crystallization temperature). To increase the rate of production without increasing the size of the apparatus, the heating is preferably carried out at a temperature of 190° to 210° C. for approximately 1 min. This causes the crystallization of the PET (which becomes whitish) forming the neck which, being thereafter mechanically rigid, can be used as a gripping and anchoring part during the subsequent operations. Relatively slow cooling, on the order of 20 seconds, is then carried out to ensure the conservation of the crystalline state to thus obtain a preform 9 with a crystallized PET neck 10 (FIG. 3).

As shown in FIG. 2A, the first heating station 4 can be arranged as a circular carousel with a heating zone 11 for the necks followed by a cooling zone 12. At the carousel exit the performs 9 are taken by a transporter 13 to a second heating station 14, which comprises a succession of infrared ovens 15 arranged in a corridor or tunnel through which the preforms are conveyed. Their crystalline PET necks 10 are thermally protected during this operation, whereat they are heated to at least 70°-72° C. (PET softening temperature), and preferably 100° to 120° C. for 25 seconds.

The heated preform bodies are then taken by a transporter 16 to a first molding station 17, which is also preferably in the form of a carousel. The hot preform body 5 is introduced into a matrix 18 whose cavity 19 has an identical shape to that of the body of the container to be obtained, but with dimensions which are substantially larger by approximately 20% in height and 0 to 30% in width. More specifically, bottles whose contents will be undergoing subsequent pasteurization are molded with a width equal to that of the final bottle; on the other hand, bottles which will be heat filled are molded with a width 30% greater than that of the final bottle.

The molding is carried out by introducing a mandrel 20 inside the preform 9 to axially lengthen its body 5 to the bottom of the cavity 19, and by blowing in compressed air or the like at an initial pressure of about 10 bars to tension the material, and then at about 40 bars to expand the body and to press it against the walls of the cavity 19; the entire cycle lasts approximately 3 to 10 seconds. During this operation the walls of the matrix are cooled by air and/or water such that their temperature remains between 5° and 40° C., preferably between 10° C. and 15° C., with the PET still being at a temperature on the order of 90° C.

At the first molding station 17, a first intermediate container 21 is thus produced which still has the same neck 10 and a body 22 with dimensions which are substantially larger than those of the final container. The intermediate container 21 is conveyed by a transporter 23 to a third heating station 24 in which it is subjected to a temperature of 180° to 220° C. for a period of 1 min. to 15 min., and preferably 210° C. for approximately 1 min. 30 sec. Here again, only the body 22 of the container undergoes heat treatment; the neck is insulated from the heat, and remains at a temperature preferably below 70° C.

Upon exiting the third heating station 24, the body 26 of container 25 (FIG. 3) is considerably deformed and shrunken, especially towards its bottom which has lost its hemispherical shape. It is conveyed by a transporter 27 to a second molding station 28, also in the form of a carousel. The body of the container 25 is introduced into a matrix 29 whose cavity 30 has the exact shape and dimensions of the final container body. The operation takes place as before: a mandrel 31 is introduced into the body 26 to axially lengthen it and to center it on the bottom of the cavity 10, and compressed air at 40 bars is introduced to expand the body and cause it to take the shape of the cavity 30, with the matrix being at a temperature of 80° C. 100° C. The total length of the cycle is 2 to 6 seconds.

Upon exiting the second molding station 28 a container 32 is obtained whose body 33 has its final shape and dimensions. When the container has a hemispherical bottom as shown in the drawings, it is then conveyed by a transporter 34 to a final finishing station to receive a flat bottomed base 35 to give the final container 36 (FIG. 3) the required vertical stability.

What is claimed is:

1. A two-step biorientation method for manufacturing containers of polyethyleneterephthalate (PET) which are capable of subsequently being subjected, without substantial deformation, to relatively severe heat conditions during processes such as being filled with a hot liquid or the pasteurization of their contents, comprising, in sequence, the steps of:
   (a) on an amorphous PET container preform (1) comprising a body portion (5) and a neck portion (2) which is already conformed to its final shape and dimensions, heating at a first heating station only the neck to a temperature and for a time sufficient to crystallize the neck;
   (b) slowly cooling the neck;
   (c) at a second heating station, heating only the body (5) of the preform (9), exclusive of the neck, to the softening temperature of PET;
   (d) blow molding the hot preform body in a first blow mold having mold walls maintained at a temperature of from 5° to 40° C. to form a intermediate container whose body (22) has dimensions greater by approximately 20% in height and 0 to 30% in width than the dimensions of a final container to be obtained, a first biorientation occurring during this blow molding step; thereafter,
   (e) at a third heating station, heating only the body (22) of the intermediate container to a temperature of 180° to 220° C. for a period of 1 to 15 minutes, said intermediate container undergoing considerable deformation and shrinkage as a result of this heating step; and then,
   (f) transferring said hot intermediate container from step (e) to a second blow mold and blow molding said hot intermediate container to its final shape and dimensions in said second blow mold having mold walls maintained at a temperature of 80° to 100° C. for a period of 2 to 6 seconds, a second biorientation occurring during this blow molding step.

2. The method in accordance with claim 1, wherein during step (c) the temperature is 100° to 120° C. and the heating is conducted for a period of 10° to 60 seconds, preferably 25 seconds.

3. The method in accordance with claim 1, wherein the molding carried out in step (f) takes place at a temperature of 90° to 95° C. for 4 seconds.

4. The method in accordance with claim 1, wherein during step (e) the neck is maintained at a temperature not exceeding 80° C., and preferably at 70° C.

5. The method in accordance with claim 1, wherein the molding operation of step (d) is carried out for a period of 3 to 10 seconds, with the mold walls cooled to a temperature of 10° to 15° C.

6. The method in accordance with claim 1, wherein during the molding operations of steps (d) and (f), the body of the preform or of the container, respectively, is lengthened mechanically so that it occupies axially the entire length of a mold cavity, and a fluid under pressure is blown to expand it and cause it to take on the shape of the walls of the mold cavity.

* * * * *